(12) United States Patent
Takeshita et al.

(10) Patent No.: US 8,173,933 B2
(45) Date of Patent: May 8, 2012

(54) METHOD AND APPARATUS FOR FORMING HOLE

(75) Inventors: Kengo Takeshita, Kariya (JP); Takashi Hoshiyama, Obu (JP)

(73) Assignee: DENSO CORPORATION, Kariya (JP)

( * ) Notice: Subject to any disclaimer, the term of this patent is extended or adjusted under 35 U.S.C. 154(b) by 925 days.

(21) Appl. No.: 12/198,506

(22) Filed: Aug. 26, 2008

(65) Prior Publication Data

US 2009/0057281 A1 Mar. 5, 2009

(30) Foreign Application Priority Data

Aug. 28, 2007 (JP) ................................. 2007-221124

(51) Int. Cl.
*B23K 26/00* (2006.01)
*B26D 1/00* (2006.01)
(52) U.S. Cl. ..................................... 219/121.71; 83/681
(58) Field of Classification Search .. 219/121.6–121.82; 83/681, 682, 684
See application file for complete search history.

(56) References Cited

U.S. PATENT DOCUMENTS

| 2,168,377 | A | * | 8/1939 | Wales | 83/140 |
| 3,696,504 | A | * | 10/1972 | Cupler, II | 29/558 |
| 5,692,423 | A | * | 12/1997 | Hachikawa et al. | 83/19 |
| 6,678,955 | B2 | | 1/2004 | Takeshita et al. | |

FOREIGN PATENT DOCUMENTS

| JP | 2-224828 | 9/1990 |
| JP | 3-165986 | 7/1991 |
| JP | 3-165987 | 7/1991 |
| JP | 4-365527 | 12/1992 |
| JP | 9-216021 | 8/1997 |
| JP | 11-129085 | 5/1999 |
| JP | 2002-102977 | 4/2002 |

OTHER PUBLICATIONS

Japanese Office Action dated Jul. 14, 2009, issued in corresponding Japanese Application No. 2007-221124, with English translation.
Japanese Office Action dated Feb. 16, 2010, issued in corresponding Japanese Application No. 2007-221124, with English translation.

* cited by examiner

*Primary Examiner* — Sang Paik
(74) *Attorney, Agent, or Firm* — Nixon & Vanderhye PC

(57) ABSTRACT

In a method of forming a hole on a work piece, a laser beam is directed from a laser head to a predetermined portion of the work piece to form a pilot hole having a first surface condition, and then the predetermined portion of the work piece is punched using a die and a punch having a cross-section greater than a cross-section of the pilot hole. Thus, a finished hole having a cross-section greater than the cross-section of the pilot hole is formed over the pilot hole. The finished hole has a second surface condition, and the second surface condition is formed by transforming the first surface condition by the punch to have a precise dimension.

4 Claims, 4 Drawing Sheets

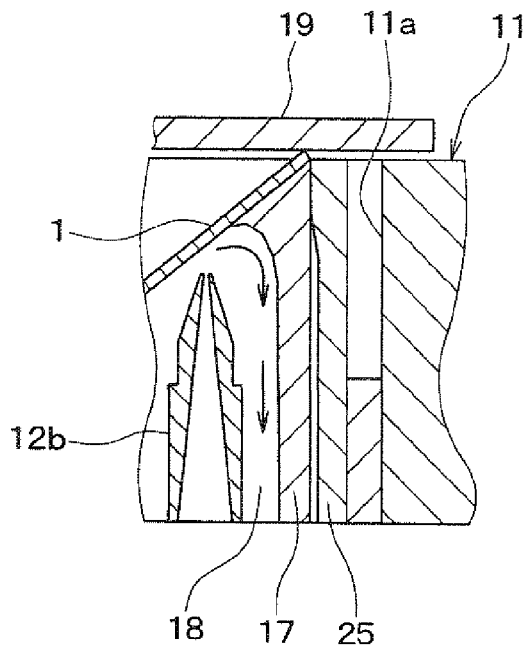
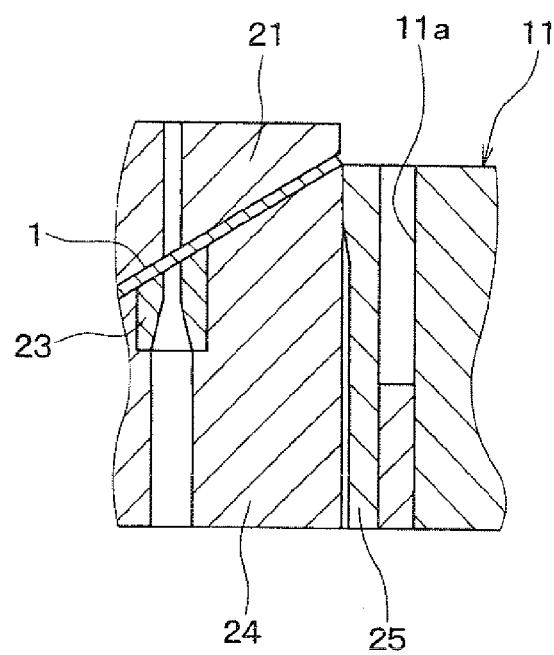
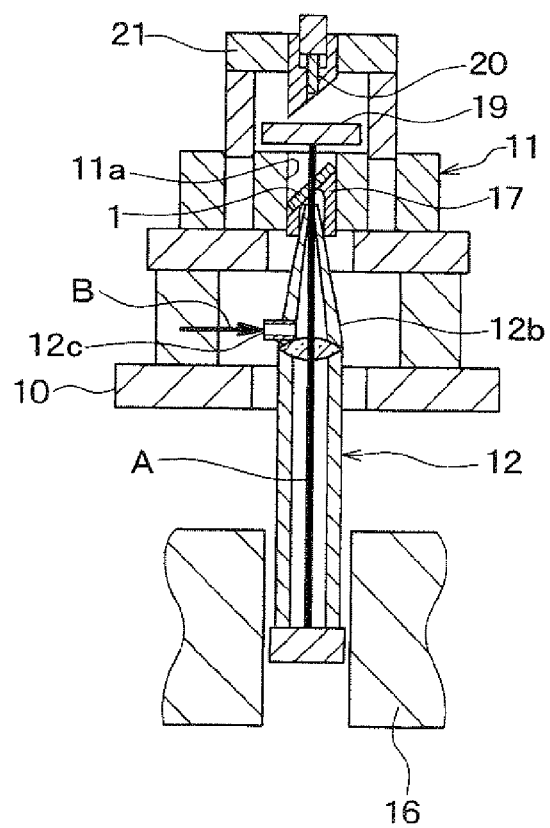

METHOD AND APPARATUS FOR FORMING HOLE

CROSS REFERENCE TO RELATED APPLICATION

This application is based on Japanese Patent Application No. 2007-221124 filed on Aug. 28, 2007, the disclosure of which is incorporated herein by reference

FIELD OF THE INVENTION

The present invention relates to a method and an apparatus for forming a hole, such as an injection hole of a fuel injection nozzle.

BACKGROUND OF THE INVENTION

Punching using a die and a punch is conventionally known as a method of forming holes with high quality and at high productivity. For example, Japanese Unexamined Patent Application Publication No. 2002-102977 (U.S. Pat. No. 6,678,955) describes an apparatus and a method of forming an injection hole of a fuel injection nozzle by punching. Electrical discharge working and laser beam working are also generally known as methods of forming holes.

In general, a punch receives a large processing load when being pressed into a work piece for punching. If the work piece is elastically deformed and expanded by the punch when the punch is pressed in the work piece, the work piece sticks to the punch due to a reaction force when the punch is removed from the work piece. As a result, the punch receives a tensile stress.

To form a hole in which a ratio of depth L to an inner diameter D is equal to or greater than two (L/D≧2), a punch having a thin and long columnar shape is used. The thin and long punch will be easily bucked under a large processing load when being pressed into the work piece. Also, the thin and long punch will be easily ruptured due to a tensile stress when being removed from the work piece. Thus, it is difficult to form the hole having the relationship of L/D≧2 by punching.

On the other hand, the hole having the relationship of L/D≧2 can be formed by the electric discharge working or the laser working. However, the electric discharge working takes a long time to form the hole, resulting in deterioration of productivity and an increase in manufacturing costs.

In the laser working, the hole can be formed in a short time, as compared with the electric discharge working. However, dimensional accuracy is deteriorated and an inner surface of the hole is generally rough, as compared with the electric discharge working. Therefore, it is difficult to achieve sufficient processing quality.

SUMMARY OF THE INVENTION

The present invention is made in view of the foregoing matter, and it is an object of the present invention to provide a method of forming holes with sufficient processing quality at high productivity. It is another object of the present invention to provide an apparatus for forming holes with sufficient processing quality at high productivity.

According to an aspect, a method of forming a hole on a work piece includes directing a laser beam from a laser head to a predetermined portion of the work piece to form a pilot hole and punching the predetermined portion of the work piece using a die and a punch having a cross-section greater than a cross-section of the pilot hole to form a finished hole having a cross-section greater than the cross-section of the pilot hole.

Since the pilot hole is formed before the punching, a processing load exerted to the punch while the punch is pressed into the work piece is reduced. Also, a tensile stress exerted to the punch while the punch is removed from the work piece is reduced. As such, buckling and rupture of the punch will be reduced.

In the directing of the laser beam, the pilot hole having a first surface condition is formed. In the punching, the finished hole is formed by transforming the first surface condition into a second surface condition that has a precise dimension. Therefore, processing accuracy and the quality of hole improve.

Further, the laser working and the punching achieve productivity higher than an electric discharge working. Therefore, the hole having sufficient processing quality is formed at high productivity.

According to another aspect, an apparatus for forming a hole on a work piece includes a laser head capable of directing a laser beam to a predetermined portion of a work piece to form a pilot hole, a punch capable of forming a finished hole over the pilot hole, and a die capable of receiving the punch during punching. The punch has a cross-section greater than a cross-section of the pilot hole.

Since the punch is operated to form a finished hole over the pilot hole, a processing load exerted to the punch while the punch is pressed into the work piece is reduced. Also, a tensile stress exerted to the punch while the punch is removed from the work piece is reduced. As such, buckling and rupture of the punch will be reduced.

The pilot hole having a first surface condition is formed by the laser head. The punch is capable of transforming the first surface condition into a second surface condition that has a precise dimension. Therefore, processing accuracy and the quality of hole improve.

Further, the laser working and the punching achieve productivity higher than an electric discharge working. Therefore, high productivity and improvement of the quality are achieved.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 2A is an enlarged cross-sectional view of a part of a laser working unit of the working apparatus during a laser processing according to the embodiment;

FIG. 2B is an enlarged cross-sectional view of a part of a punching unit of the working apparatus during a punching according to the embodiment;

FIG. 3 is a schematic cross-sectional view of the working apparatus during laser working according to the embodiment;

DETAILED DESCRIPTION OF EXEMPLARY EMBODIMENT

Figure 1:
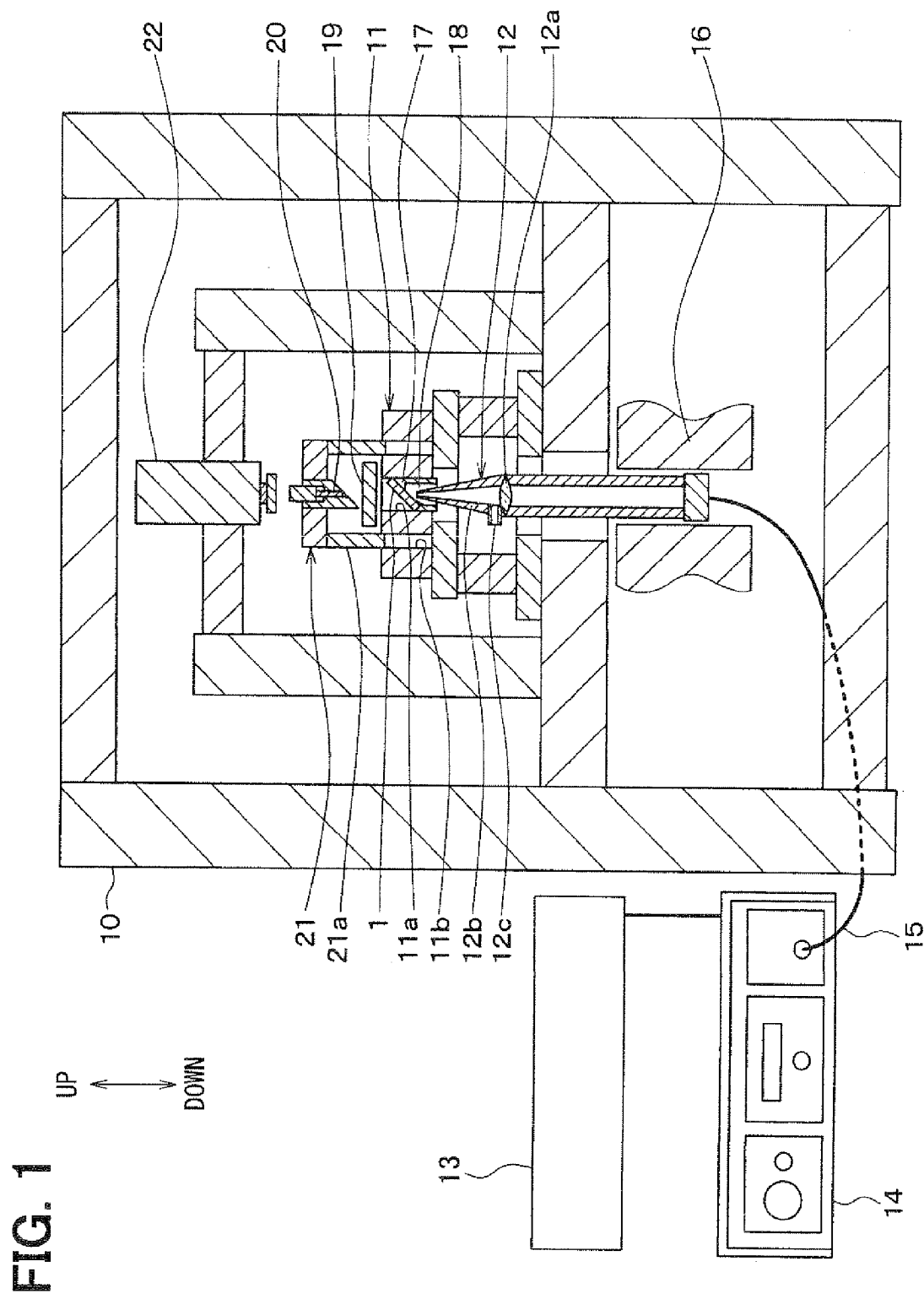
FIG. 1 is a cross-sectional view of a working apparatus for forming a hole on a work piece according to an embodiment of the present invention.

An embodiment of the present invention will now be described with reference to FIGS. 1 through 6C. Referring to FIG. 1, a working apparatus of the present embodiment is employed to work a hole in a work piece 1. The working apparatus is, for example, employed to form an injection hole of a fuel injection nozzle. In FIG. 1, an up and down arrow denotes a direction in a condition that the working apparatus is arranged.

The working apparatus generally includes a laser working unit for performing laser working and a punching unit for performing punching. The laser working unit and the punching unit are configured to be movable with respect to the work piece 1, so that the laser working and the punching are performed while holding the work piece 1 at a predetermined position. That is, the working apparatus is capable of switching a laser working condition for performing the laser working and a punching condition for performing the punching without moving the work piece 1.

Figure 6A:
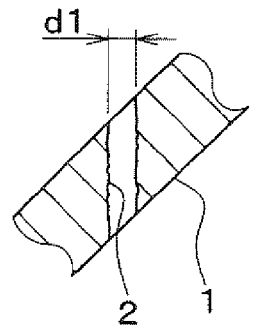
FIG. 6A is a schematic cross-sectional view of a pilot hole formed on the work piece by laser working according to the embodiment.
Figure 6B:
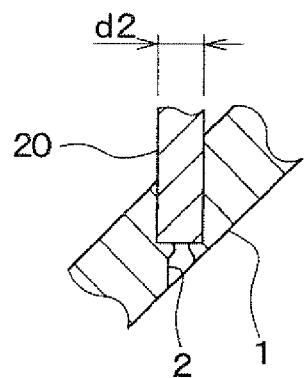
FIG. 6B is a schematic cross-sectional view of the work piece for showing a condition of being punched by a punch of the punching unit according to the embodiment.
Figure 6C:
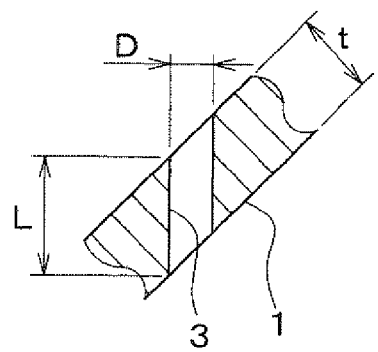
FIG. 6C is a schematic cross-sectional view of a finished hole formed on the work piece by punching according to the embodiment.

For example, the work piece 1 is a flat plate having a predetermined thickness t as shown in FIG. 6C. The working apparatus has a stand 10 and a die plate 11 as a work piece holder for holding the work piece 1. The die plate 11 is fixed to the stand 10. The die plate 11 has a center hole portion 11a at its center. The center hole portion 11a is formed with a holding portion (not shown) that is capable of holding the work piece 1 in a predetermined position. In the present embodiment, the holding portion is capable of holding the work piece 1 in an inclined position inclined at a predetermined angle relative to a horizontal plane.

The laser working unit generally includes a laser head 12, an oscillator 13, a function generator 14, a slide guide 16, a cover 17, and a light shielding plate 19. The laser head 12 is placed under the work piece 1. The laser head 12 is capable of radiating a laser beam in an upward direction toward the work piece 1. The laser head 12 has a condensing lens 12a and a nozzle portion 12b. A fiber laser beam generated by the oscillator 13 and the function generator 14 is concentrated through the condensing lens 12a and is radiated from the nozzle portion 12b. The laser head 12 is connected to the oscillator 13 through a fiber 15.

The nozzle portion 12b has an assist gas inlet 12c between the concentrating lens 12a and an end of the nozzle portion 12b. In the laser working, an assist gas such as nitrogen, air, or the like is introduced in the nozzle portion 12b from the assist gas inlet 12c and is directed toward the work piece 1 from the nozzle portion 12b.

The slide guide 16 is disposed under the die plate 11. The laser head 12 is movable along the slide guide 16 in an up and down direction by a slide mechanism (not shown) such as an air cylinder and the like. The slide mechanism is included in a moving mechanism.

Figure 4A:
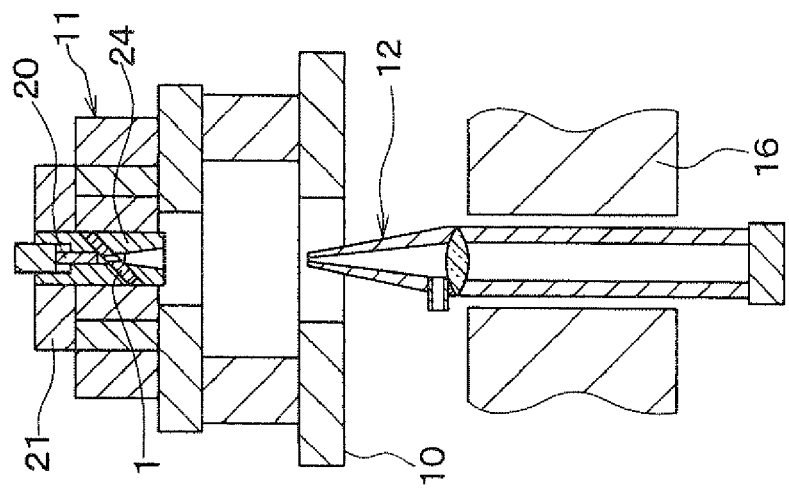
FIGS. 4A to 4C are schematic cross-sectional views of the working apparatus for showing procedures of switching the working apparatus from a laser working condition to a punching condition according to the embodiment.
Figure 4B:
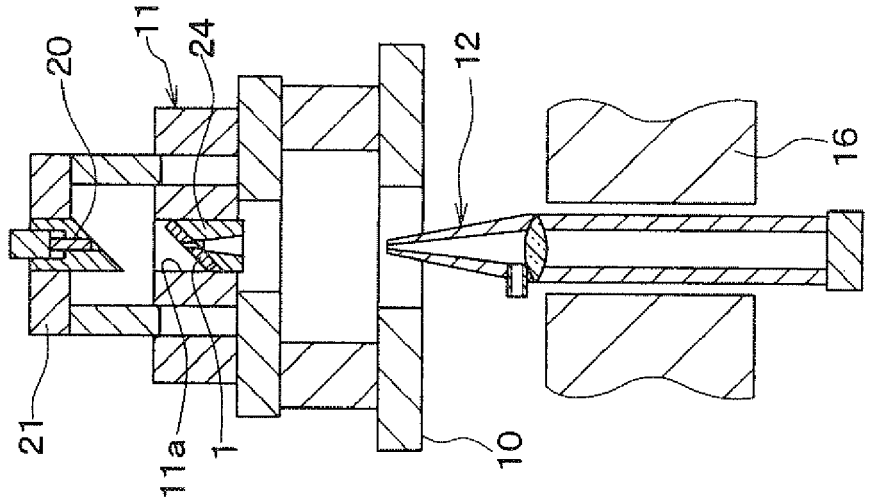
Figure 4C:
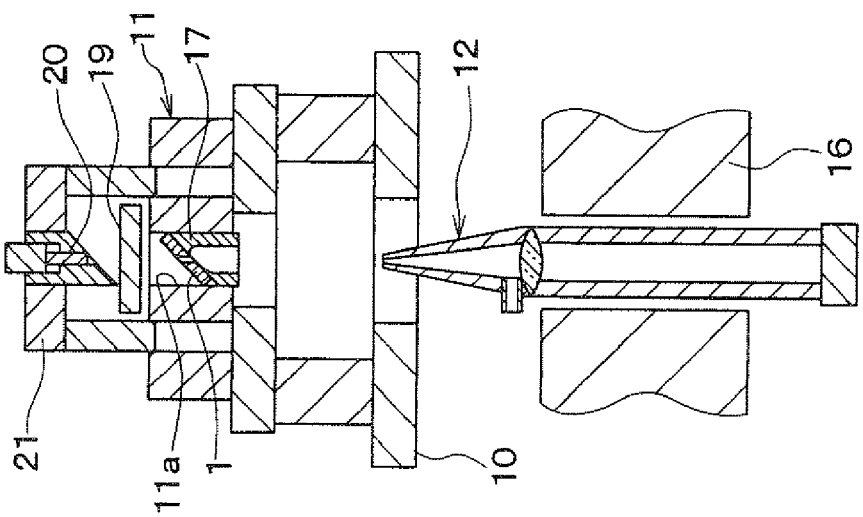

The nozzle portion 12b is placed in the center hole portion 11a in the laser working. When the working apparatus is switched from the laser working condition to the punching condition, the laser head 12 is moved downwardly and is placed under the die plate 11, as shown in FIGS. 4A to 4C.

The cover 17 has a substantially cylindrical shape. The cover 17 is arranged on a periphery of the nozzle portion 12b in the center hole portion 11a such that an annular clearance 18 is provided between an inner surface of the cover 17 and an outer surface of the nozzle portion 12b. The cover 17 serves to restrict spatter from sticking to an inner wall of the center hole portion 11a during the laser working.

When the working apparatus is switched from the laser working condition to the punching condition, the cover 17 is moved right under the center hole portion 11a of the die plate 11 and further moved in a direction perpendicular to an axis of the center hole portion 11a, such as in a direction perpendicular to a paper surface of FIG. 1.

The shielding plate 19 is arranged immediately above the center hole portion 11a for shielding the laser beam passing through the work piece I in the laser working. When the working apparatus is switched from the laser working condition to the punching condition, the light shielding plate 19 is moved in a direction perpendicular to the axis of the center hole portion 11a by the moving mechanism, which includes such as an air cylinder and the like.

The punching unit includes a punch 20, a punch holder 21 for holding the punch 20, a pressing device 22, a die 23, a die holder 24 and a die holder guide 25. The punch 20 and the punch holder 21 are movable in the up and down direction by the moving mechanism, which includes such as an air cylinder and the like.

The punch holder 21 is provided with a guide pin 21a. The die plate 11 is formed with a guide hole 11b. The guide pin 21a is slidable in the guide hole 11b in the up and down direction. Thus, the up and down movement of the punch 20 and the punch holder 21 is guided by means of the guide pin 21a and the guide hole 11b.

The punch 20 and the punch holder 21 are located above the light shielding plate in the laser working condition. When the working apparatus is switched from the laser working condition to the punching condition, the punch 20 and the punch holder 21 are moved downwardly and the guide pin 21 is aligned with the guide hole 11b from the top of the die plate 11, as shown in FIGS. 4A to 4C.

The pressing device 22 is provided to apply a pressing force to the punch 20 during the punching. The pressing device 22 is arranged above the punch 20. The pressing device 22 is constructed of an air cylinder, for example. The pressing device 22 is, for example, fixed to the stand 10. Alternatively, the pressing device 22 is fixed to the punch holder 21 so that the pressing device 22 can be moved in the up and down direction with the punch 20 and the punch holder 21, with respect to the stand 10.

The die 23 is held by the die holder 24. In the laser working condition, the die 23 and the die holder 24 are located away from the die plate 11, such as on a back of the laser head 12 in FIG. 1. When the working apparatus is switched from the laser working condition to the punching condition, the die 23 and the die holder 24 are moved in the direction perpendicular to the axis of the center hole portion 11a to a position immediately under the center hole portion 11a by the moving mechanism, which includes such as an air cylinder and the like. The die 23 and the die holder 24 are further moved upward and inserted in the center hole portion 11a by the moving mechanism.

The die holder guide 25 serves to align the die 23 and the die holder 24 with respect to the center hole portion ha of the die plate 11. The die holder guide 25 has a substantially cylindrical shape and is arranged in the center hole portion 11a to be coaxial with the center hole portion 11a, as shown in FIG. 2B. The die holder 24 is received in the die holder guide 25. A clearance is provided between an outer surface of the die holder 24 and an inner surface of the die holder guide 25. The clearance is 0.01 mm at a lower end of the die holder guide 25.

The inner surface of the die holder guide 25 is tapered toward an upper end such that the clearance gradually reduces from the lower end toward the upper end in an axial direction. The clearance is zero at the upper end.

Next, a method of working a hole by the working apparatus will be described with reference to FIGS. 3 through 6C.

(1) Laser Working

The working apparatus is set in the laser working condition as shown in FIG. 3. The nozzle portion 12b and the cover 17 are placed in the center hole portion 11a of the die plate 11. The light shielding plate 19 is placed immediately above the center hole portion 11a.

The laser beam is directed to the work piece 1 from the nozzle portion 12b, as shown by an arrow A in FIG. 3, while injecting the assist gas through the assist gas inlet 12c, as shown by an arrow B. Thus, as shown in FIG. 6A, a pilot hole 2 having an inner diameter d1 is formed in the work piece 1. The inner diameter d1 is smaller than an outer diameter d2 of the punch 20, as shown in FIG. 6B.

Although spatter is generated while the pilot hole 2 is formed by the laser working, the spatter is dropped through the annular clearance 18 provided between the nozzle portion 12b and the cover 17, as shown by arrows in FIG. 2A. Therefore, it is leas likely that the spatter will stick to the inner surface of the die holder guide 25.

(2) Switching of the Working Apparatus

After the pilot hole 2 is formed, the working apparatus is switched from the laser working condition to the punching condition, as shown in FIGS. 4A to 4C. First, the laser head 12 is moved downwardly and separated from the die plate 11, as shown in FIG. 4A. Also, the cover 17 and the light shielding plate 19 are moved away from the die plate 11. For example, the cover 17 is moved downwardly to a position immediately under the center hole portion 11a and is then moved in the direction perpendicular to the axis of the center hole portion 11a. The light shielding plate 19 is moved in the direction perpendicular to the axis of the center hole portion 11a.

Then, the die 23 and the die holder 24 are inserted in the center hole portion 11a of the die plate 11, as shown in FIG. 4B. For example, the die 23 and the die holder 24 are moved in the direction perpendicular to the axis of the center hole portion 11a and placed immediately under the center hole portion 11a. Then, the die 23 and the die holder 24 are moved upwardly and inserted in the center hole portion 11a.

The cover 17 is located inside of the die holder guide 25 during the laser working. Therefore, it is less likely that the spatter will stick to the inner surface of the guide 25 during the laser working. As such, during the switching, the die 23 and the die holder 24 can be smoothly guided by the die holder guide 25 and set to the predetermined position.

Next, the punch 20 and the punch holder 21 are moved downwardly and inserted in the center hole portion 11a of the die plate 11. At this time, the punch 20 is placed to be coaxial with the pilot hole 2 formed in the work piece 1. In this way, the working apparatus is switched from the laser working condition to the punching condition.

(3) Punching

Figure 5:
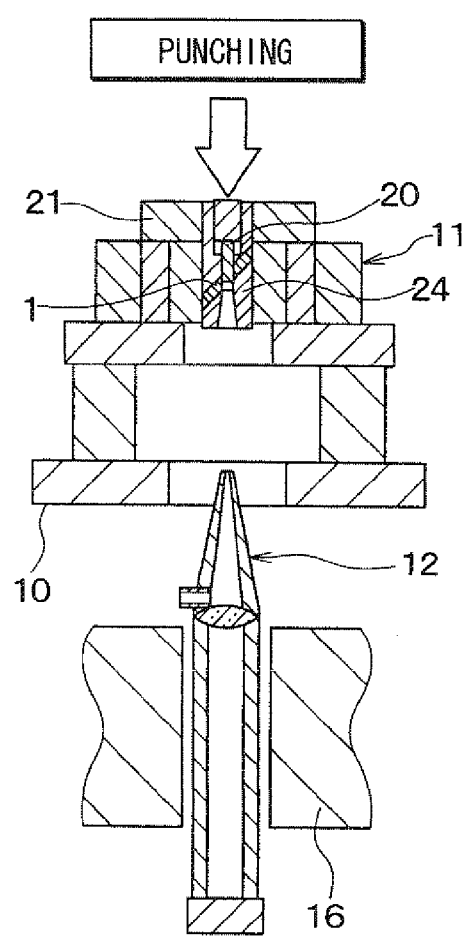
FIG. 5 is a schematic cross-sectional view of the working apparatus during punching according to the embodiment.

The punch 20 is pressed toward a predetermined portion of the work piece 1 where the pilot hole 2 has been formed by the pressing device 22, as shown in FIG. 5. Thus, the predetermined portion of the work piece 1 is punched. Accordingly, a hole (finished hole) 3 having a diameter D and a depth L is formed in the work piece 1, as shown in FIG. 6C.

Since the pilot hole 2 is formed by the laser working, the pilot hole 2 has a rough surface condition, as shown in FIG. 6A. Since the finished hole 3 is formed by the punching, a surface condition of the finished hole 3 is more precise than the surface condition of the pilot hole 2, as shown in FIG. 6C.

When the working apparatus is switched from the punching condition to the laser working condition, the laser working unit and the punching unit are moved in a reverse manner shown in FIGS. 4A to 4C.

In the present embodiment, the pilot hole 2 having the inner diameter d1 smaller than the outer diameter d2 of the punch 20 is formed before the punching. In the punching, a hole is formed over the pilot hole 2 by the punch 20. Therefore, the punching is performed similar to shaving by the punch 20. That is, the inner surface of the finished hole 3 is formed by shaving the inner surface of the pilot hole 2 by the punch 20, as shown in FIG. 6B. In other words, the finished hole 3 is formed by transforming the inner surface of the pilot hole to have a precise dimension.

The pilot hole 2 having a first surface condition is formed by the laser working. Then, the finished hole 3 is formed by transforming the first surface condition into a second surface condition to have a precise dimension by the punch 20.

Since the processing load exerted to the punch 20 while the punch 20 is being pressed is reduced, it is less likely that the punch 20 will be buckled.

Since the pilot hole 2 is formed before the punching, it is less likely that the work piece 1 will be elastically deformed to be expanded by the punch 20 when the punch 20 passes through the work piece 1.

As such, when the punch 20 is removed from the work piece 1, it is less likely that the work piece 1 will stick to the punch 20 by a reaction force. Accordingly, because a tensile stress to the punch 20 is reduced, damage to the punch 20 can be reduced.

The finished hole 3 is formed by punching, which achieves high processing accuracy. Therefore, the quality of the finished hole 3 improves.

In the present embodiment, although the finished hole 3 is formed through two steps, such as the laser working and the punching, each of the laser working and the punching achieves high productivity, as compared with electric discharge working. Therefore, the hole 3 is effectively formed at productivity that is higher than productivity of the electric discharge working. High productivity and high quality of processing are achieved.

The working apparatus and the method of the present embodiment are compared with a comparative example in which the laser working unit including the laser head 12 and the like and the punching unit including the punch 20, the die 23 and the like are fixed at different positions. In the comparative example, after the pilot hole 2 is formed in the laser working unit, the work piece is carried to the punching unit to form the finished hole 3. In this case, productivity is reduced due to the time of carrying the work piece 1 from the laser working unit to the punching unit. In addition, it is difficult to punch the hole 3 at an accurate position due to displacement of the work piece 1 since the work piece 1 is carried.

In the present embodiment, on the other hand, the laser working unit and the punching unit are moved with respect to the work piece 1. That is, the laser working and the punching are performed while fixing the work piece 1 at a predetermined position. Therefore, a time for carrying the work piece 1 between the laser working unit and the punching unit is not necessary. Also, since the work piece 1 is not moved between the laser working condition and the punching condition, that is, the work piece 1 is held at the same position in the laser working condition and the punching condition, the hole 3 can be formed at an accurate position. Accordingly, the productivity and the quality of processing improve.

For example, the inner diameter d1 of the pilot hole 2 is 0.070 mm, the outer diameter d2 of the punch 20 is 0.085 mm, and a length of the punch 20 is 2 mm. In this case, the finished hole 3 is formed with an inner diameter D of 0.085 mm and a length L of 0.5 mm. A ratio of the length L to the inner diameter D (L/D) is 5.9.

For example, a ratio of the inner diameter d1 of the pilot hole 2 to the outer diameter d2 of the punch 20 is at least 0.6 and at most 0.9 ($0.6 \leq d1/d2 \leq 0.9$). The punch 20 is placed coaxial with the pilot hole 2 such that a displacement between an axis of the pilot hole 2 and an axis of the punch 20 is equal to or less than 0.005 mm, for example.

In general, the injection hole of the fuel injection nozzle requires a large L/D ratio and high quality in order to improve fuel injection. Therefore, the working apparatus and the method of the present embodiment, which achieve the high productivity and the high quality, are effectively used to form the injection hole.

(Other Embodiments)

The present invention is not limited to the above embodiment. The working apparatus and the method are employed to form a hole with different inner diameter and different depth. Further, the working apparatus and the method can be employed to form any hole other than the injection hole of the fuel injection nozzle.

In the above embodiment, the finished hole 3 has a circular shape. However, the shape of the finished hole 3 is not limited to the circle, but can have any shape such as a rectangular, a slit-like shape or the like. For example, a pilot hole is formed on the work piece 1 by laser working. Then, the portion of the work piece 1 where the pilot hole is formed is punched by a punch having a cross-section greater than a cross-section of the pilot hole. Thus, the finished hole having a cross-section greater than the cross-section of the pilot hole is formed in the work piece 1.

To form the slit-like hole, a pilot hole in the form of slit is formed by laser working, and then the portion of the work piece 1 where the slit-like pilot hole is formed is punched by a punch having a cross-section greater than that of the pilot hole.

In the above embodiment, the hole 3 is angled relative to a plane of the work piece 1. However, the hole 3 can be formed perpendicular to the plane of the work piece 1. Also, the work piece 1 is not limited to the flat plate.

FIGS. 4A to 4C show an example of switching the working apparatus between the laser working condition and the punching condition. However, the way of switching the working apparatus is not limited to the above discussed and illustrated example.

Additional advantages and modifications will readily occur to those skilled in the art. The invention in its broader term is therefore not limited to the specific details, representative apparatus, and illustrative examples shown and described.

What is claimed is:

1. An apparatus for forming a hole on a work piece, comprising:
    a laser head capable of forming a pilot hole with a first surface condition by directing a laser beam;
    a punch capable of forming a finished hole over the pilot hole with a second surface condition by transforming the first surface condition, the punch having a cross-section greater than a cross-section of the pilot hole, the second surface condition having a precise dimension more than the first surface condition;
    a die disposed opposite to the punch with respect to the work piece during forming of the finished hole;
    a work piece holder capable of holding the work piece at a predetermined position; and
    a moving mechanism capable of moving at least one of the laser head, the die and the punch with respect to the work piece, thereby to switch a laser working condition for forming the pilot hole and a punching condition for forming the finished hole, wherein
    the work piece holder has a center hole portion at a center, the apparatus further comprising:
    a die holder guide disposed in the hole portion of the work piece holder;
    a die holder holding the die and capable of being disposed in the die holder guide in the punching condition; and
    a cover capable of being disposed in the die holder guide in the laser working condition, wherein
    the die holder guide is capable of aligning the die holder with respect to the work piece holder, and
    the cover provides a clearance on a periphery of a nozzle of the laser head in the laser working condition.

2. The apparatus according to claim 1, wherein
    the pilot hole has a circular shape, and the punch has a cylindrical shape, and
    the punch is configured such that a ratio of an inner diameter of the pilot hole to an outer diameter of the punch is at least 0.6 and at most 0.9.

3. An apparatus for forming a hole on a work piece, comprising:
    a work piece holder capable of holding the work piece at a predetermined position;
    a laser head disposed under the work piece and capable of forming a pilot hole on the work piece with a first surface condition by directing a laser beam;
    a punch disposed above the work piece and capable of forming a finished hole over the pilot hole with a second surface condition by transforming the first surface condition, the punch having a cross-section greater than a cross-section of the pilot hole, the second surface condition having a precise dimension more than the first surface condition;
    a die disposed opposite to the punch with respect to the work piece during forming of the finished hole;
    a moving mechanism capable of moving the laser head and the die with respect to the work piece, thereby to switch a laser working condition for forming the pilot hole and a punching condition for forming the finished hole; and
    a die holder guide having a substantially cylindrical shape and capable of aligning the die with respect to the work piece holder in the punching condition, wherein
    the moving mechanism places the laser head under the work piece and in the die holder guide and places the die to a location away from the laser head, in the laser working condition, and
    the moving mechanism places the laser head to a location lower than a location where the laser head is placed in the laser working condition and places the die under the work piece and in the die holder guide, in the punching condition.

4. An apparatus for forming a hole on a work piece, comprising:
    a work piece holder capable of holding the work piece at a predetermined position;

a laser head disposed under the work piece and capable of forming a pilot hole on the work piece with a first surface condition by directing a laser beam;

a punch disposed above the work piece and capable of forming a finished hole over the pilot hole with a second surface condition by transforming the first surface condition, the punch having a cross-section greater than a cross-section of the pilot hole, the second surface condition having a precise dimension more than the first surface condition;

a die disposed opposite to the punch with respect to the work piece during forming of the finished hole; and a moving mechanism capable of moving the laser head and the die with respect to the work piece, thereby to switch a laser working condition for forming the pilot hole and a punching condition for forming the finished hole, wherein the moving mechanism places the laser head under the work piece and places the die to a location away from the laser head, in the laser working condition, the moving mechanism places the laser head to a location lower than a location where the laser head is placed in the laser working condition and places the die under the work piece, in the punching condition, and the laser head and the punch are coaxially aligned to each other in the laser working condition and in the punching condition.

\* \* \* \* \*